Nov. 8, 1955  R. P. FEATHERSTONE  2,723,371
ARC SAFETY DEVICE FOR HIGH VOLTAGE POWER SUPPLY
Filed April 22, 1954
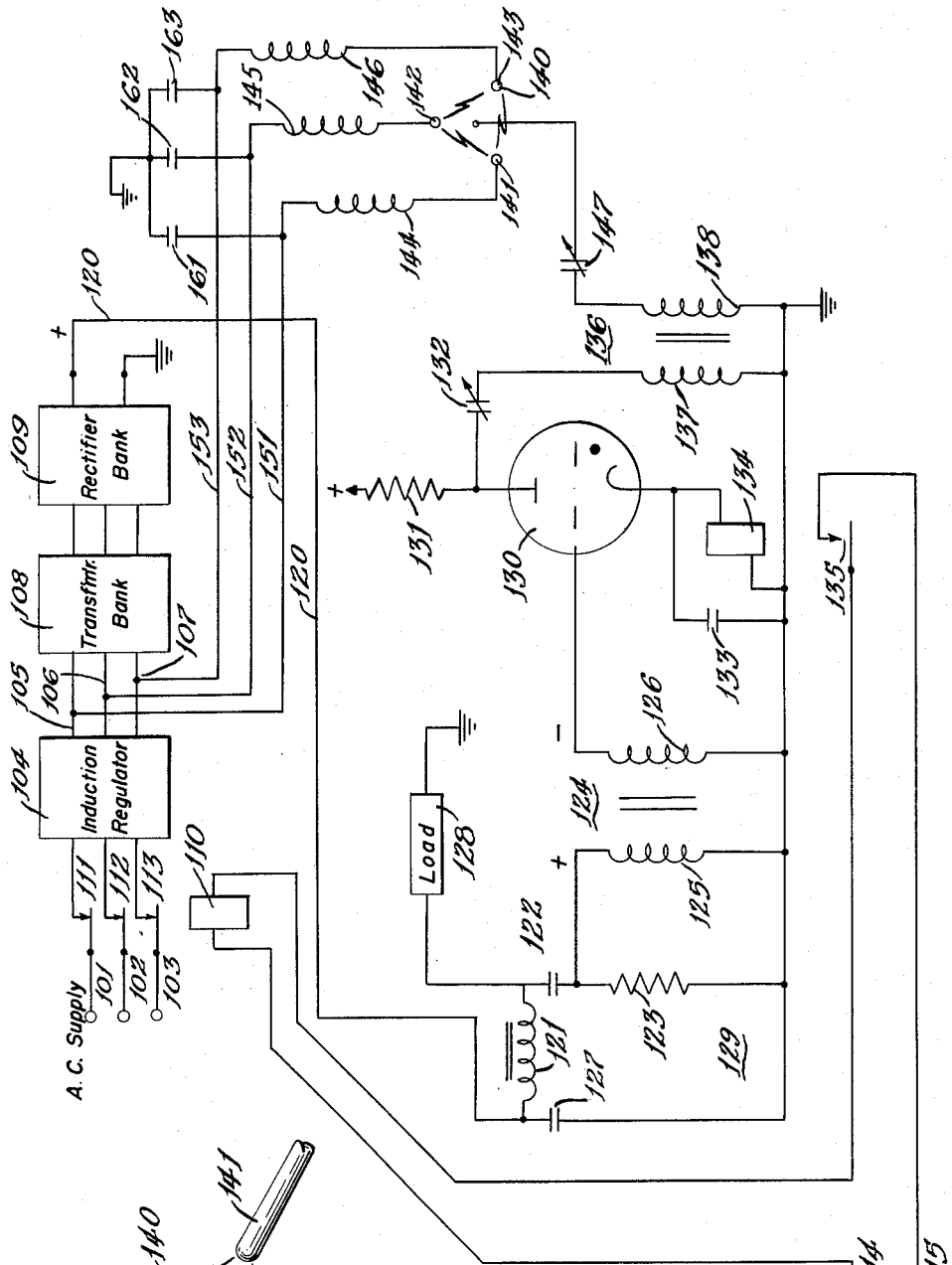
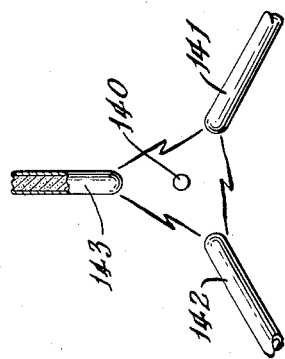
INVENTOR.
Robert P. Featherstone
BY
ATTORNEY

United States Patent Office 2,723,371
Patented Nov. 8, 1955

2,723,371

ARC SAFETY DEVICE FOR HIGH VOLTAGE POWER SUPPLY

Robert P. Featherstone, Minneapolis, Minn., assignor to the United States of America as represented by the United States Atomic Energy Commission Application April 22, 1954, Serial No. 425,059

7 Claims. (Cl. 321—14)

This invention relates to protective control circuits and more particularly to a protective control circuit for a rectifier system which is used in conjunction with a high voltage alternating current supply system.

Conventional means, such as circuit breakers, are commonly used to protect a rectifier system against damage caused by excessive currents due to faults occurring in the output. One of the shortcomings of a circuit breaker is its relatively long response time before it will function and open an A. C. input connected to the rectifier system. It is therefore desirable to develop a circuit which would protect the system during the interval that it requires the circuit breaker to operate and trip open the A. C. input.

It is an object of my invention to provide a protective control circuit which operates, whenever a fault occurs in the rectifier output, during the interim required by the circuit breaker to function.

It is also an object of my invention to provide a protective circuit which, after its first operation due to a fault occurring in the output of the rectifier, will resume its protective control over the rectifier to guard it against subsequently occurring faults without the necessity of resetting the circuit by an operator.

It is a further object of the invention to provide a circuit to protect high power rectifier tubes against excessive currents by initiating an arc discharge in the input of the rectifier.

Further objects of my invention will become apparent from the embodiment thereof illustrated in the drawing which diagrammatically represents my invention as applied to a protective control for a rectifier system.

Figure 1 is a schematic diagram of the protective control circuit described in this embodiment.

Figure 2 is a plan view of the triggering and the line electrodes used in this embodiment.

Referring to Figure 1 the rectifier to be protected against overload currents occurring in its output is indicated in block form as a rectifier bank 109. The input of the rectifier bank 109 is obtained from an A. C. power supply over lines 101—103 via break contacts 111—113 of a circuit breaker 110, induction regulator 104 and transformer bank 108. The induction regulator 104 is used to keep the voltage fed into the transformer bank 108 at a constant magnitude. The high side of the output of the rectifier bank 109 is connected over line 120 through a power filter 129 to a load indicated as a block 128. The filter 129, comprising capacitors 127, 122, and inductor 121 and a resistor 123, is used to filter the rectifier output to a desired degree.

The major components of the protective control circuit comprise a pulse transformer 124, a space discharge device 130, preferably a gas tube, an output pulse transformer 136 and line electrodes 141—143. A primary winding 125 of the pulse transformer 124 is connected across the resistor 123 which in series with the capacitor 122 is connected from an output end of the inductor 121 to ground. The ungrounded end of the secondary winding 126 of transformer 124 is connected to the grid of the gas tube 130. The plate of the gas tube 130 is connected through a current limiting resistor 131 to a source of positive potential. The cathode of tube 130 is connected through the winding of relay 134 to ground. A capacitor 133 bypasses the winding of the relay 134 for a purpose which will be mentioned hereinafter. Relay 134 functions, whenever the gas tube 130 is energized, to control the operation of the main line circuit breaker 110. The gas tube 130, during the state of ionization, serves as a discharge circuit for the charge on capacitor 132 which is connected in series with a primary winding 137 of an output pulse transformer 136 across the plate of the tube 130 to ground. A secondary winding 138 of the output pulse transformer 136 is connected to a triggering electrode 140 by way of capacitor 147. The triggering electrode 140 is centrally disposed among line electrodes 141—143 which are individually connected through inductors 144—146, respectively, to the input of the transformer bank 108 via lines 151—153, respectively.

A fault occurring in the output of the rectifier bank 109 will cause an excessive transient current to flow in the resistor 123 to thereby impress a high voltage on the input of the pulse transformer 124. This high voltage is shaped by the transformer 124 into a pulse which triggers the gas tube 130. The capacitor 132, which has been previously charged up through the resistor 131, thereupon discharges through the ionized gas tube 130 to thereby generate a pulse in the output pulse transformer 136. The output pulse, as stepped up by the transformer 136, then passes through the blocking capacitor 147 to the triggering electrode 140 to initiate spark discharges between it and any one of the line or sparking electrodes 141—143. Immediately thereafter, arc discharges due to line voltage are established between all of the line electrodes to cause a temporary short across the lines 105—107, to thereby lower the magnitude of the potential existing at the input of the transformer bank 108.

Inductors 144—146 present a high impedance to the triggering pulse so that it is capable of initiating an arc discharge with more than just one line electrode. The impedance presented to the power frequency currents is low. No damage is sustained by the system as a result of these short circuit arcs because the internal impedance of the induction regulator 104 restricts the magnitude of the arc discharge current for a short time until the circuit breaker 110 has time to trip the A. C. input.

Capacitors 161—163 shunt the lines 105—107 to ground to provide a discharge path for the triggering pulse initiating the spark discharges between the triggering electrode 140 and any of the line electrodes 141—143. The winding of the main line circuit breaker 110 is energized from a separate voltage supply, which is independent of the rectifier system, through break contacts 135 which are controlled by the operation of relay 134.

Referring to Figure 2, the various electrodes described hereinbefore are shown in a plan view to indicate the spatial relationship therebetween. The triggering electrode 140 is a rod of conductive material centrally disposed between the line electrodes 141—143. The line electrodes are ¾-inch diameter carbon rods sheathed with copper to minimize resistive drop. A cutaway view of electrode 143 discloses the cladding of the carbon rod with copper. The gap spacing between the line electrodes is 1/32 of an inch at initial adjustment; the gaps are reset after eroding to about 1/16 inch. The shorter the air gap the lower the voltage at which the spark gap is able to operate reliably.

The method of operation will now be described in detail. Whenever the rectifier system is functioning properly and supplying voltage to the load 128, the capacitor 122 is charged up to the full voltage appearing across the load 128. This voltage, employing the circuit constants hereinafter set forth, is in the vicinity of 90,000 volts. The capacitor 132 is charged up to the voltage appearing at the plate of the tube 130, namely 10,000 volts. When a fault occurs somewhere in the load 128, the load current rises abruptly to many times its normal value. The abnormal rise of the fault current does not immediately stress the tubes located in the rectifier bank 109 because of the momentary protection offered by the choke coil 121 due to the self-inductance characteristics. Since the current flow through the choke coil 121 cannot change rapidly, most of the abrnormal current initiated by the fault is supplied by the capacitor 122. As a result, the electrons stored on the lower plate of the capacitor 122 will pass through the low value resistance, namely the current-sampling resistor 123, to ground, and from ground through the fault occurring in the load 128 over to the upper plate of capacitor 122. This surge of electrons through the resistor 123 produces a large voltage drop thereover which will appear also across the input winding 125 of the pulse transformer 124. As shown, the upper extremity of the input winding 125 is indicated as being of positive polarity due to self-inductance of the winding. This self-induced voltage in the primary 125 will cause a pulse to appear across the secondary winding 126, said pulse being an inversion of the induced pulse and possessing negative polarity and sufficient magnitude to initiate the ionization of the gas tube 130. The tube 130 is operated under conditions such that the voltages appearing across the resistor 123 during normal operation of the system will not trigger it, but the tube will operate when a fault occurs in the system which fault will be indirectly responsible for the occurrence of a negative output pulse and its consequent application to the grid of the tube 130.

When the gas tube 130 fires, its plate to cathode voltage drops to a very low value so that nearly the full voltage impressed across the capacitor 132 appears across the primary winding 137 of the output pulse transformer 136; the electron discharge path extending from one plate of capacitor 132, primary winding 137, ground, capacitor 133, and the cathode-plate discharge space of the tube 130 to the other plate of capacitor 132. The voltage input to the primary winding 137 is considerably stepped up and appears as a high voltage pulse which possesses a duration of only a few microseconds. This high intensity pulse is connected to the triggering electrode 140 through the blocking capacitor 147. The blocking capacitor prevents damage to the pulse transformer 136 by the 60-cycle power feeding back into the pulse transformer secondary 138 (which has a very low impedance at 60 cycles) when an arc is struck between the triggering electrode 140 and any one of the line electrodes 141—143.

As the triggering electrode voltage rises, some point is reached at which an arc is struck between the triggering electrode 140 and one of the line electrodes. The purpose of the inductors 144—146 is to present a high impedance to the rapidly rising triggering voltage appearing at the electrode 140 thereby keeping the loading effect small, so that the triggering voltage recovers rapidly from the drop that occurs when the arc strikes between the triggering electrode 140 and the first one of any of the line electrodes. This allows the pulse to continue onward in its ascent. In a short time the voltage is sufficient to break down the gap existing between the first struck electrode and one of the other line electrodes. Once more the triggering voltage recovers and continues to rise, and an arc is then struck across the remaining interelectrode space to establish a final arc. The time duration for the occurrence and initiation of the arc between the line electrodes is in the order of one microsecond. A typical pulse path may be traced from the top of secondary winding 138, through winding 138, ground, capacitor 161, inductor 144, across the gap between the line electrode 141 and triggering electrode 140, capacitor 147 and back to the point of origin.

As of now, all line electrodes 141 to 143 are joined by arc discharges. The triggering voltage dies away rapidly and is negligible after a few microseconds. The arcs existing between the line electrodes continue to be sustained by the line currents supplied over the lines 151 to 153. (In a three-phase system there is no problem of striking and maintaining an arc at zero voltage such as there is in the single-phase system, as long as arcs join all of the line electrodes). The arcs existing between the several line electrodes function to lower the voltage impressed across the input of the transformer bank 108 thereby preventing excessive currents from being rectified by the rectifier tubes in the rectifier bank 109 which rectifier tubes are susceptible to damage because of such an overload. It is to be understood that the lowering of the voltage across the input occurs only for a very short length of time, namely in the order of one-twelfth of a second, this being the interval of time necessary to enable the circuit breaker 110 to operate and trip the power circuit. Lest it be overloked, relay 134 became operated at the time the gas tube 130 was fired with the result that contacts 135 closed an obvious energizing circuit to the circuit breaker relay 110.

Resistor 131 is sufficiently large enough so that the grid of gas tube 130 is capable of regaining control after the capacitor 132 has become discharged. After the tube 130 has returned to normal, that is, has become deionized, capacitor 132 charges up again to its former voltage value through the resistor 131. Having once again resumed its fully charged condition, the capacitor 132 with its associated circuit is again ready for operation on a subsequent fault occurring somewhere in the load 128.

A table of typical values of components that were used in this embodiment is indicated below.

| Component: | Approximate value |
|---|---|
| Inductor 121 | henries 16 |
| Inductor 144 | microhenries 15 |
| Capacitor 127 | mf 0.17 |
| Capacitor 122 | mf 6.6 |
| Capacitor 132 | mf 0.05 |
| Capacitor 133 | mf 2.0 |
| Capacitor 141 | mf 0.05 |
| Capacitor 161 | mf 0.2 |
| Resistor 123 | ohms 0.09 |
| Resistor 131 | megohms 10.0 |
| Tube 130 | 5C22 |

While I have shown and described a specific embodiment of this invention, further modifications and improvements thereof are possible by those skilled in the art. I desire it to be understood, therefore, that this invention is not limited to the specific form shown and I intend in the appended claims to cover all modifications which do not depart from the spirit and scope of this invention.

What is claimed is:

1. In a rectifier system comprising a rectifier circuit having an input and an output, a circuit breaker interposed between the input and an alternating voltage supply and adapted to trip open the input of the rectifier circuit, and actuating means connecting the output of the rectifier circuit to said circuit breaker to operate said circuit breaker in response to an overload, said actuating means and the circuit breaker having a certain fixed operating time, the improvement comprising voltage dropping means connected to the input of said rectifier circuit to decrease the voltage fed thereto, and a second actuating means connecting the output of the rectifier circuit to the voltage dropping means to actuate the voltage dropping means in response to an overload, the voltage dropping means and said second actuating means having a shorter operating time than said fixed operating time, whereby the rectifier circuit is protected from damage caused during the relatively long fixed operating time.

2. The improved rectifier system of claim 1 wherein the voltage dropping means comprises a plurality of spaced line electrodes, each connected to a separate power line terminal in the input to the rectifier circuit, and the second actuating means comprises a starter electrode uniformly adjacent to all of said line electrodes and means responsive to an overload to impress a high voltage pulse between the starter electrode and said line electrodes to initiate an arc between the spaced electrodes, whereby the input voltage is lowered to the magnitude supporting the arc during the interval that it takes the circuit breaker to operate and trip open the input to the rectifier circuit.

3. The system as claimed in claim 2 wherein there are provided devices having high impedance to said pulse but low impedance to said alternating voltage in the connections between the input of the rectifier circuit and said line electrodes to maintain the voltage amplitude of the pulse initiating the arc so that additional arcs may be established between the remaining line electrodes.

4. In a rectifier system comprising a rectifier circuit having an input connected through a circuit breaker to a source of alternating current and an output spanned by a capacitor, the improvement wherein there are provided a resistor connected in series with the capacitor across the output, a grid controlled discharge tube circuit having an input and an output, a plurality of spaced sparking electrodes connected across the input of the rectifier circuit, a starter electrode equidistantly disposed among said sparking electrodes, means for coupling a voltage surge due to an overload occurring in said resistor to the input of the discharge tube circuit, and means for coupling the output of the discharge tube circuit to the circuit breaker and to the starter electrode to initiate spark discharges between all of said sparking electrodes, whereby a fault occurring in the output of the rectifier circuit is responsible for dropping momentarily the voltage at the input thereto to a magnitude existing across said spark discharges thereby protecting the rectifier circuit during the interim required by the circuit breaker to operate.

5. In a rectifier system comprising a rectifier circuit having an input connected to an alternating voltage supply line and an output connected through a filter having a capacitor output, break contacts interposed between the connections between the line and the input to the rectifier circuit and controlled by a circuit breaker, the improvement wherein there are provided a resistor connected in series with the capacitor in the output of said filter, a space discharge circuit having an input and an output, a plurality of spaced line electrodes connected across the input of the rectifier circuit, a triggering electrode equidistantly disposed from said plurality of line electrodes, means for connecting the voltage surge at the junction of said capacitor and said resistor to the input of the space discharge circuit, other means coupling the output of the space discharge circuit to said triggering electrode to initiate arcs between said line electrodes whereby the voltage at the input is substantially reduced to that existing across the arcs.

6. The system of claim 5 wherein there are provided a control relay incorporated within said space discharge circuit, and means controlled by the control relay to actuate said circuit breaker to open said break contacts, whereby the power supply lines are disconnected from the input of the rectifier circuit.

7. The system of claim 6 wherein there are provided a plurality of inductors in the connections between the line electrodes and the input to present a high impedance to the trigger pulse whereby the voltage magnitude of the pulse is substantially preserved to establish arcs between the remaining line electrodes.

References Cited in the file of this patent

UNITED STATES PATENTS

| | | |
|---|---|---|
| 1,201,031 | Fortescue | Oct. 10, 1916 |
| 1,320,125 | Chubb | Oct. 28, 1919 |
| 2,052,814 | Widmer et al. | Sept. 1, 1936 |
| 2,123,859 | Winograd | July 12, 1938 |
| 2,132,839 | Widmer et al. | Oct. 11, 1938 |
| 2,209,818 | Hauffe | July 30, 1940 |